Apr. 10, 1923.
J. E. WALTER
1,450,930
DIRECTION SIGNAL FOR VEHICLES
Filed Apr. 29, 1922   2 sheets-sheet 2
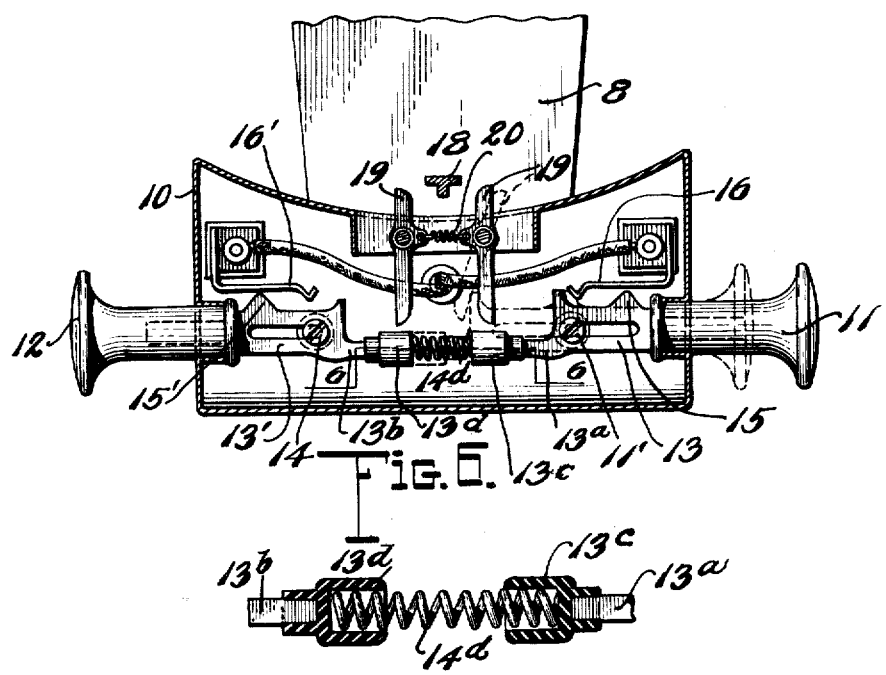
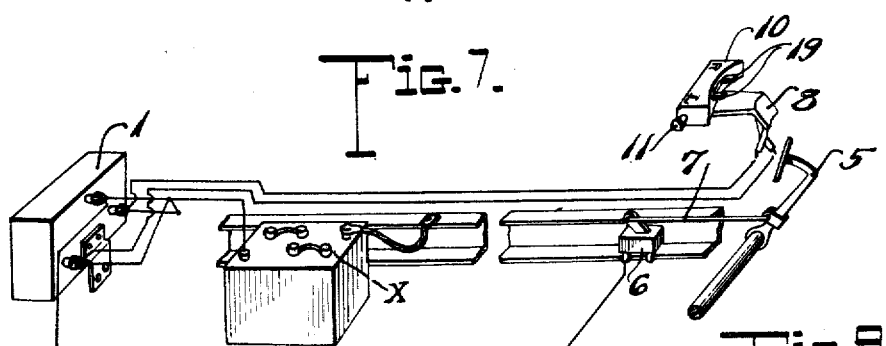
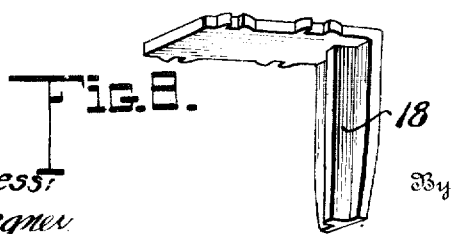

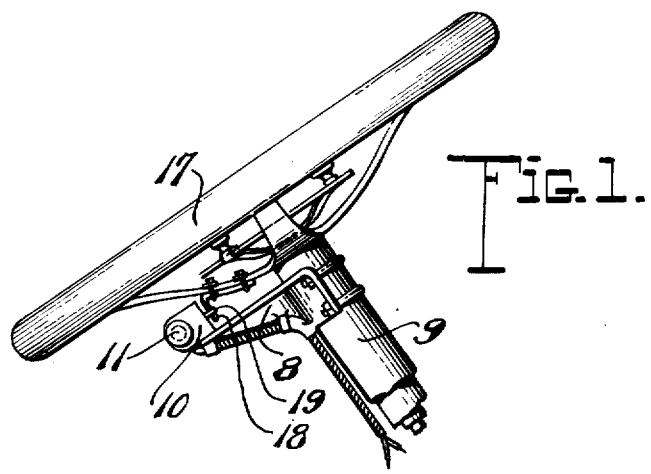
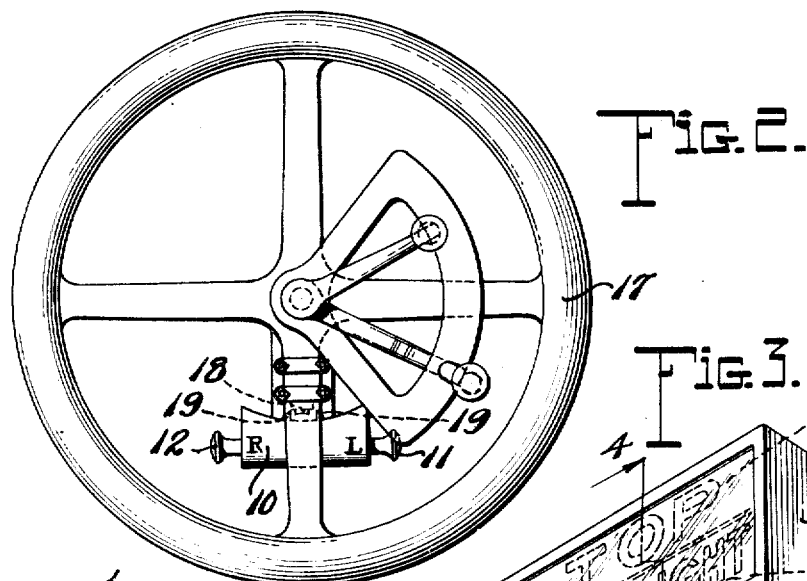
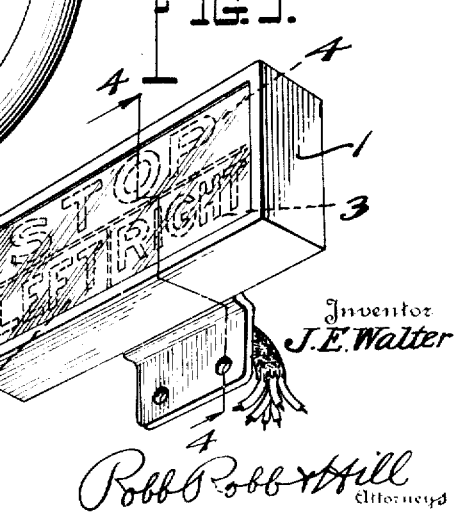
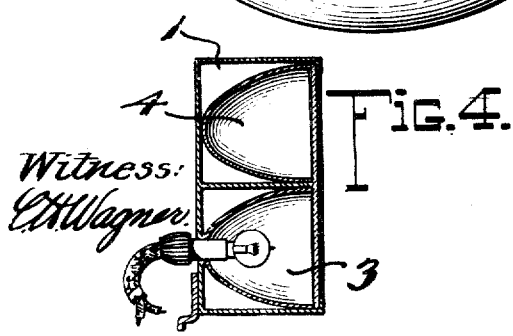

Patented Apr. 10, 1923.

1,450,930

UNITED STATES PATENT OFFICE.

JOHN E. WALTER, OF WAUKEGAN, ILLINOIS.

DIRECTION SIGNAL FOR VEHICLES.

Application filed April 29, 1922. Serial No. 557,300.

*To all whom it may concern:*

Be it known that I, JOHN E. WALTER, a citizen of the United States, residing at Waukegan, in the county of Lake and State of Illinois, have invented certain new and useful Improvements in Direction Signals for Vehicles, of which the following is a specification.

The present invention appertains to improvements in signal apparatus designed to apprise traffic of the contemplated change in direction of movement or intention of stopping of the vehicle to which it is applied.

The primary object in view is to provide a simple appliance capable of application to all general types of motor vehicles and so arranged that the driver as he approaches the point of making a turn to either the right or left, needs only to press a controller button, thereby closing an electric circuit to a signal casing having suitable signs or indications which are illuminated to warn approaching vehicles of the character of movement, the normalizing or discontinuing of the signal taking place automatically incident to the resumption of the direct travel of the vehicle.

A further object in view is to provide novel controlling means for the signal designed to be attached at a convenient and accessible position to coact with the steering means which latter is utilized to effect the signal normalization aforesaid, the arrangement being such that the controlling means is unaffected during the initial turning movement.

A still further object is to provide in conjunction with the "right" and "left" turning signal, a "stop" indication signal which is automatically operated by the brake instrumentalities to give the desired signal advising of the intended stoppage of the vehicle.

With the above and other objects in view, the invention consists in certain combinations and arrangements of the parts as will more fully appear as the description proceeds, the novel features thereof being pointed out in the appended claims.

In the drawings:

Figure 1 is a side elevation of the upper portion of the steering column having my controller unit applied in position.

Figure 2 is a plan view thereof.

Figure 3 is a perspective view of the signal unit.

Figure 4 is a section on the line 4—4 of Figure 3.

Figure 5 is a sectional view through the signal controlling means.

Figure 6 is a sectional view on the line 6—6 of Figure 5.

Figure 7 is a diagrammatic showing of the complete appliance.

Figure 8 is a perspective view of the actuating finger which is attached to one of the spokes of the steering wheel.

Figure 9 is an elevation of the rear signal casing.

Corresponding and like parts are referred to in the following description and indicated on all of the views of the drawings by like reference characters.

Referring to the drawings, the invention includes the signal unit comprising the casing 1 of rectangular or other configuration attached at the rear of a vehicle, although it is to be understood that said vehicle may have a corresponding front signal casing working in harmony with the rear signal, as may be desired. The casing is preferably divided into a series of separate compartments 2, 3 and 4, and each provided with a light for illuminating the sign upon the closure for the casing. As a matter of preference, the closure consists of a pane of translucent material, such as opal glass having blocked out on its rear face the signal word which, therefore, is indiscernible normally, unless and until the light within the particular compartment is operated. The signal words in the instance illustrated are "Right", "Left" and "Stop", which suffice as exemplary of the carrying out of my idea.

The lights within the casing are in circuit with any suitable source of electric current, X, available on the vehicle, the circuit to that one contained in the compartment 4 for illuminating the "stop" signal being under the control of the brake.

The arrangement of this feature is more particularly apparent by reference to the diagrammatic view of Figure 7, wherein 5 designates the brake pedal and 6 a switch or circuit closer of any desired type operatively connected with the pedal by a rod 7. As the pedal is moved forwardly into brake applying position, the switch 6 closes the circuit, illuminating the "stop" signal, this being discontinued, automatically, upon release of the brake. The remaining signals are operated by a special controlling device which forms the primary feature of this invention, now to be particularly described.

Upon a bracket 8 attached to the steering column 9 is secured a small casing 10 from one end of which projects a button 11, and from the other end of which projects a second opposed button 12. The button 11 has a slotted extension 13 accommodating a guide screw 11' while the button 12 is provided with corresponding elements 13' and 14. Each of these extensions is formed at one edge with a projecting shoulder, one designated 15 and the other 15' to coact with adjacent spring terminals 16 and 16' respectively, in circuit with the battery or other source of current. The end of each of the terminals is V-shaped so as to act as a detent to engage with the shoulder on the button extension and thereby hold the latter in circuit closed position when it has been pressed inwardly.

The button 11 closes the circuit leading to the light for the signal "Left" while the button 12 closes that for the signal "Right".

Detachably connected to a spoke of the steering wheel 17 is a depending finger 18 which in the normal position of the wheel in driving straight away extends downwardly in close relation to the casing 10 so as to lie between a pair of pivoted levers 19 projecting from the casing sufficiently far to extend into the path of arcuate movement of the finger. These levers are connected by a common spring 20 holding them normally in parallel relation. The inner ends of the levers extend into close proximity to the ends of the members 13 and 13' with which each is adapted to coact in the operation of the device.

The operation of the invention as thus described is as follows:

When the driver approaches the point where he desires to change the direction of travel to the left, for example, he presses inwardly on the button 11, thereby closing the circuit through the member 16 to the light for the signal "Left" which signal is immediately illuminated and remains so while the button is held by the member 16. In turning the steering wheel to bring about this movement of the vehicle the finger 18 contacts with the lever 19 adjacent the button 11, moving it into the dotted line position of Figure 5, finally escaping from it and allowing it to return to normal position under the influence of the spring 20, thus not functioning. As the steering wheel is now turned in the opposite direction upon completion of the change of direction of movement, the finger 18 again contacts with the projecting end of the lever 19, this time moving the inner end into contact with the extension 13 and shifting the button 11 outwardly, disengaging the member 16 and simultaneously breaking the circuit to the signal light.

It will be apparent that the same operation will take place in connection with the "right" signal button 12, through the return movement of the steering wheel which thus is the automatic means for normalizing the signal controller and signal device. An important advantage is derived from the arrangement in that it eliminates the necessity of attention on the part of the driver once he has set his signal, or the likelihood the restoration of the signal will be forgotten.

However, I have made provision for manual normalization of the signal in case the driver should for one reason or another, not make the intended turn for which the signal has been preset. To this end extension 13 and 13' of the buttons is prolonged as indicated at 13ª and 13ᵇ, bringing the extremities into close relation. These extremities carry cups 13ᶜ and 14ᶜ of insulating material forming seats for a spring 14ᵈ common to each. Thus, when one button is pressed in and locked by the terminal member as above described, the spring is compressed and the ends of the extensions 13ᵇ and 13ᶜ brought nearly into contact. To normalize the signal manually requires only that the opposite button be pressed inwardly a slight distance, not sufficient to lock it but enough to engage the end of the opposing extension and effect the button's release.

A very advantageous and simple attachment is thus provided wherein the signals are normally not apparent but quickly flashed upon operation to attract attention of a following vehicle. Obviously slight changes may be made in the details of construction without departing from the spirit of the invention and within the scope of the claims hereto appended.

Having thus described my invention, what I claim as new and desire to secure by Letters Patent is:

1. A switch for vehicle signal apparatus adapted to be arranged contiguous to the vehicle steering means, including opposed axially alined presetting members independently operable to operate the signal member to indicate an intended change of direction of movement, and vehicle operated means arranged to coact with the presetting members to restore them to normal position incident to turning movement, one of said members being movable to actuate the other to effect normalization of the set member in the event the contemplated movement is not executed.

2. A switch for vehicle signal apparatus adapted to be arranged contiguous to the vehicle steering means including a casing, alined signal presetting members mounted in said casing one at either side thereof, and means operated from the steering means of said vehicle for restoring either of said members to normal position incident to the execution of a turning movement, said signal presetting members being so disposed with relation to each other as to permit either of the same when unset to be moved into contact with the other when set to permit the latter member to be restored to normal in the event the intended movement is not executed.

3. A switch for vehicle signal apparatus adapted to be arranged contiguous to the vehicle steering means, including a casing, signal presetting members arranged in diametrically opposing alined relation to each other in said casing, an electric circuit, a catch member in said circuit at each side of the casing and arranged to coact with the adjacent presetting member, each of said catch members coacting with its presetting member at the time of engaging the same to close the circuit for the signal member and hold the presetting member in signalling position, and vehicle operated means adapted to engage said presetting members to disengage the catch members and restore the presetting members to normal position, simultaneously breaking the circuit.

4. A switch for vehicle signal apparatus including a pair of opposed button members arranged with their ends in opposed relation to each other adapted to be preset to indicate an intended change of direction of movement through the signal member, an extension carried by each of said button members having a projection thereon, a catch member adjacent each button member and adapted to engage the projection on the extension to hold said button member in preset position, an electric circuit including said catch member, said catch member acting as a circuit closer in the setting of the button member, and means operated from the steering means and engageable with the extension to disengage the latter from the catch member and restore the button to normal position.

5. A switch for vehicle signal apparatus including a casing, button members adapted to be preset to indicate an intended change of direction of movement through the signal member with their ends in opposed relation to each other, spring means intermediate the button members and common to the same, said spring means being adapted to be placed under tension when either of the button members is set for signalling purposes to restore the set button to normal position, the unset button member being operable to engage the set button member to restore the latter to normal position under the action of the spring means, and means for holding the button members at signal presetting positions.

6. A switch for vehicle signal apparatus adapted to be arranged contiguous to the vehicle steering means including a casing, alined signal presetting members mounted in said casing one at either side thereof, and means operated from the steering means of said vehicle for restoring either of said members to normal position incident to the execution of a turning movement, said signal presetting members being so disposed with relation to each other as to permit either of the same when unset to move the other when set to restore it to normal in the event the intended movement is not executed.

In testimony whereof I affix my signature.
JOHN E. WALTER.